United States Patent
Hayashi et al.

(10) Patent No.: US 9,645,027 B2
(45) Date of Patent: May 9, 2017

(54) PHYSICAL QUANTITY SENSOR, PRESSURE SENSOR, ALTIMETER, ELECTRONIC APPARATUS, AND MOVING OBJECT

(71) Applicant: Seiko Epson Corporation, Tokyo (JP)

(72) Inventors: Kazuya Hayashi, Fujimi (JP); Shoichi Nagamatsu, Shiojiri (JP); Junichi Takeuchi, Chino (JP); Takuya Kinugawa, Chino (JP)

(73) Assignee: Seiko Epson Corporation (JP)

( * ) Notice: Subject to any disclaimer, the term of this patent is extended or adjusted under 35 U.S.C. 154(b) by 91 days.

(21) Appl. No.: 14/820,716

(22) Filed: Aug. 7, 2015

(65) Prior Publication Data

US 2016/0047704 A1 Feb. 18, 2016

(30) Foreign Application Priority Data

Aug. 12, 2014 (JP) ................. 2014-164066

(51) Int. Cl.
*G01L 9/00* (2006.01)
*G01C 5/06* (2006.01)
*G01L 19/14* (2006.01)

(52) U.S. Cl.
CPC ............ *G01L 9/0042* (2013.01); *G01C 5/06* (2013.01); *G01L 9/0054* (2013.01); *G01L 19/147* (2013.01)

(58) Field of Classification Search
None
See application file for complete search history.

(56) References Cited

U.S. PATENT DOCUMENTS

| | | | |
|---|---|---|---|
| 5,631,428 A | 5/1997 | Catanescu et al. | |
| 2008/0006093 A1 | 1/2008 | Ueya | |
| 2013/0062713 A1* | 3/2013 | Sakuragi | G01L 9/0042 257/419 |
| 2015/0268114 A1* | 9/2015 | Takeuchi | G01C 5/06 73/384 |
| 2016/0027988 A1* | 1/2016 | Nagahata | H01L 41/0472 347/70 |
| 2016/0033347 A1* | 2/2016 | Hayashi | G01L 9/0054 73/723 |
| 2016/0047704 A1* | 2/2016 | Hayashi | G01L 9/0042 73/727 |

(Continued)

FOREIGN PATENT DOCUMENTS

| | | |
|---|---|---|
| JP | H08-233672 A | 9/1996 |
| JP | 2004-325361 A | 11/2004 |

(Continued)

*Primary Examiner* — Andre Allen
(74) *Attorney, Agent, or Firm* — Harness, Dickey & Pierce, P.L.C.

(57) ABSTRACT

A physical quantity sensor includes a substrate that has a recess that is open toward one side of the substrate, a diaphragm that has a bottom of the recess as part of the diaphragm and undergoes bending deformation under pressure, a piezoresistance device that is disposed in the diaphragm, a coating layer that faces the diaphragm via a cavity, and wiring layers that are disposed between the substrate and the coating layer, and form, along with the substrate and the coating layer, the cavity. Each of the wiring layers contains a metal, and in a plan view, a circumferential edge of the bottom of the recess is closer to the center of the diaphragm than a substrate-side end of an inner wall surface of one of the wiring layers.

10 Claims, 13 Drawing Sheets

(56) References Cited

U.S. PATENT DOCUMENTS

| | | | |
|---|---|---|---|
| 2016/0137494 A1* | 5/2016 | Tanaka | B81C 1/00801 257/419 |
| 2016/0138989 A1* | 5/2016 | Tanaka | G01L 9/0054 73/384 |
| 2016/0138990 A1* | 5/2016 | Tanaka | G01L 9/0054 73/727 |
| 2016/0209285 A1* | 7/2016 | Nakajima | G01L 9/065 |

FOREIGN PATENT DOCUMENTS

| | | |
|---|---|---|
| JP | 2005-037309 A | 2/2005 |
| JP | 2008-017395 A | 1/2008 |

* cited by examiner

PHYSICAL QUANTITY SENSOR, PRESSURE SENSOR, ALTIMETER, ELECTRONIC APPARATUS, AND MOVING OBJECT

CROSS REFERENCE

This application claims benefit of Japanese Application JP 2014-164066, filed on Aug. 12, 2014. The disclosure of the prior application is hereby incorporated by reference herein in its entirety.

BACKGROUND

1. Technical Field

The present invention relates to a physical quantity sensor, a pressure sensor, an altimeter, an electronic apparatus, and a moving object.

2. Related Art

A pressure sensor including a diaphragm that undergoes bending deformation under pressure is widely used (see JP-A-2005-37309, for example). In a pressure sensor of this type, the diaphragm typically includes a cavity that forms part of a wall portion, and a sensor device disposed on the diaphragm detects the amount of bending of the diaphragm to detect the pressure acting on the diaphragm.

For example, the transducer described in JP-A-2005-37309 is so configured that a recess is formed on the rear side of a silicon substrate to form a diaphragm and a vacuum chamber (cavity) made of polysilicon is provided on the front side of the silicon substrate. The sidewall of the vacuum chamber is connected to a portion thinned by the recess in the silicon substrate. That is, the silicon-substrate-side end of the sidewall surface of the vacuum chamber is located closer to the center of the diaphragm than the circumferential edge of the bottom of the recess in the silicon substrate in a plan view.

On the other hand, forming a cavity made of a metal has been proposed. However, in the transducer described in JP-A-2005-37309, in which the sidewall of the vacuum chamber is connected to the portion thinned by the recess in the silicon substrate, forming a vacuum chamber made of a metal undesirably causes the pressure-sensitive characteristic of the transducer to change with temperature due to the difference in coefficient of linear expansion between the vacuum chamber and the silicon substrate.

SUMMARY

An advantage of some aspects of the invention is to provide a physical quantity sensor having an excellent temperature characteristic, and to provide a pressure sensor, an altimeter, an electronic apparatus, and a moving object including the physical quantity sensor.

The invention can be implemented as the following application examples.

Application Example 1

A physical quantity sensor according to this application example includes a substrate that has a recess that is open toward one side of the substrate, a diaphragm that has a bottom of the recess as part of the diaphragm and undergoes bending deformation under pressure, a sensor device that is disposed in the diaphragm, a ceiling portion that faces the diaphragm via a cavity, and a sidewall portion that is disposed between the substrate and the ceiling portion, forms, along with the substrate and the ceiling portion, the cavity, and has an inner wall surface that faces the cavity, at least one of the ceiling portion and the sidewall portion contains a metal, and in a plan view of the substrate, a circumferential edge of the bottom is closer to the center of the diaphragm than a substrate-side end of the inner wall surface.

According to the physical quantity sensor, since the sidewall portion is connected to a thick, relatively rigid portion of the substrate (portion different from thin portion where recess is formed), transmission of distortion of the ceiling portion or the sidewall portion to the diaphragm (thin portion) can be suppressed even when a difference in coefficient of linear expansion between the ceiling portion or the sidewall portion and the substrate is large. A physical quantity sensor having an excellent temperature characteristic can therefore be provided.

Application Example 2

In the physical quantity sensor according to the application example, it is preferable that both the ceiling portion and the sidewall portion contain a metal.

With this configuration, the cavity can be formed in a very hermetic manner.

Application Example 3

In the physical quantity sensor according to the application example, it is preferable that the metal is aluminum, titanium, or a titanium nitride.

These metals have close affinity with a semiconductor manufacturing process. The cavity can therefore be formed with precision in a relatively simple manner.

Application Example 4

In the physical quantity sensor according to the application example, it is preferable that, in the plan view, the substrate has a portion separate from a substrate-side end of an inner circumferential surface of the sidewall portion by a value greater than or equal to 0.1 μm but smaller than or equal to 25 μm.

With this configuration, transmission of distortion of the ceiling portion or the sidewall portion to the diaphragm can be effectively suppressed.

Application Example 5

In the physical quantity sensor according to the application example, it is preferable that the recess in the substrate is formed of a plurality of recesses, and that the diaphragm is formed of a plurality of diaphragms, and in the plan view, the plurality of diaphragms fall within the region of the single cavity.

With this configuration, detection sensitivity can be increased.

Application Example 6

In the physical quantity sensor according to the application example, it is preferable that the cavity is disposed on the opposite side of the substrate to the side where the recess is open.

In this case, the effects provided by the invention are significantly advantageous.

Application Example 7

A pressure sensor according to this application example includes the physical quantity sensor according to the application example.

With this configuration, a pressure sensor having an excellent temperature characteristic can be provided.

Application Example 8

An altimeter according to this application example includes the physical quantity sensor according to the application example.

With this configuration, an altimeter having an excellent temperature characteristic can be provided.

Application Example 9

An electronic apparatus according to the application example includes the physical quantity sensor according to the application example.

With this configuration, an electronic apparatus including the physical quantity sensor having an excellent temperature characteristic can be provided.

Application Example 10

A moving object according to this application example includes the physical quantity sensor according to the application example.

With this configuration, a moving object including the physical quantity sensor having an excellent temperature characteristic can be provided.

BRIEF DESCRIPTION OF THE DRAWINGS

The invention will be described with reference to the accompanying drawings, wherein like numbers reference like elements.

FIG. 3A is a cross-sectional view showing a pressurized state, and FIG. 3B is a plan view showing the pressurized state.

DESCRIPTION OF EXEMPLARY EMBODIMENTS

A physical quantity sensor, a pressure sensor, an altimeter, an electronic apparatus, and a moving object according to embodiments of the invention will be described below in detail with reference to the accompanying drawings.

1. Physical Quantity Sensor

First Embodiment

Figure 1:
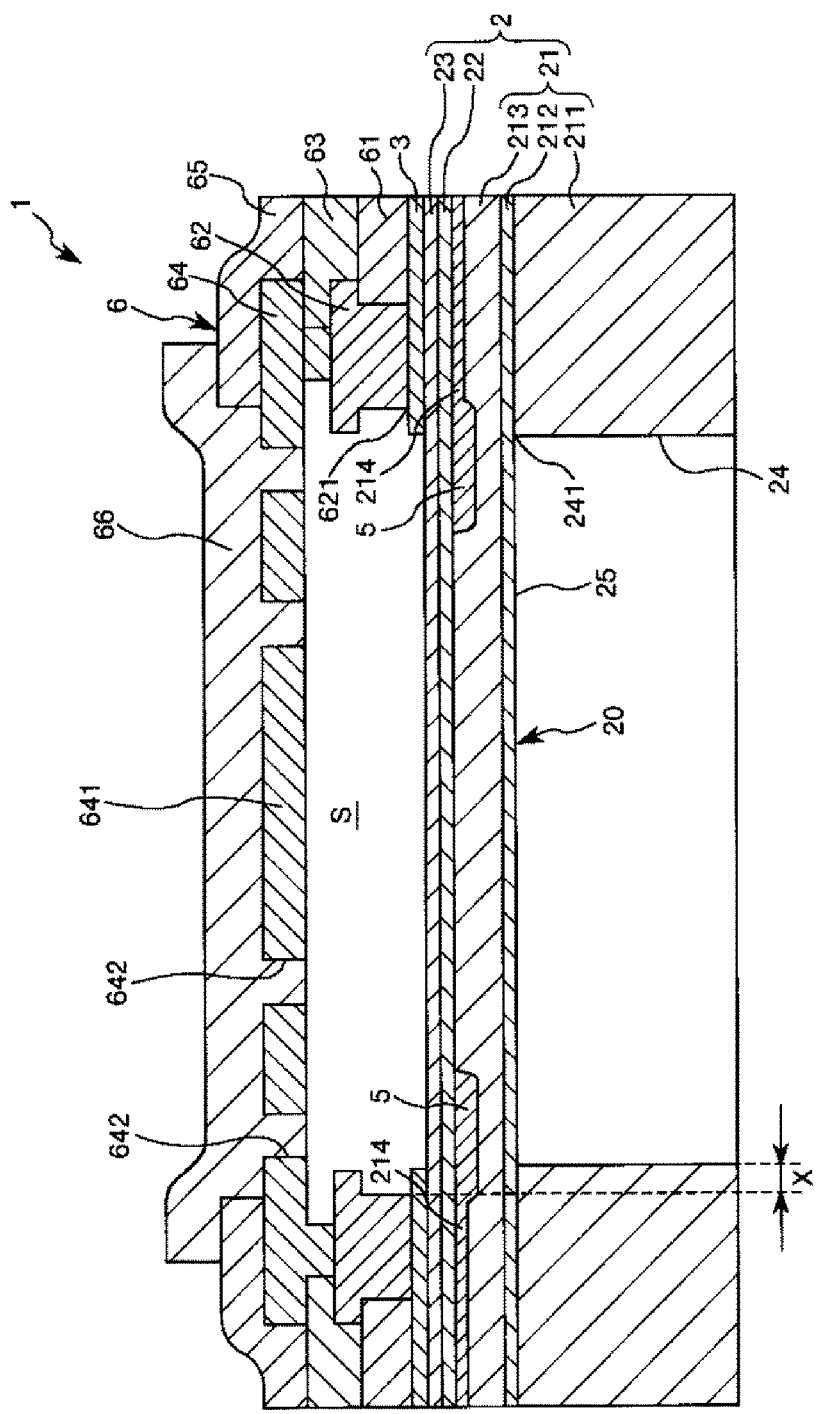
FIG. 1 is a cross-sectional view showing a physical quantity sensor according to a first embodiment of the invention.
Figure 2:
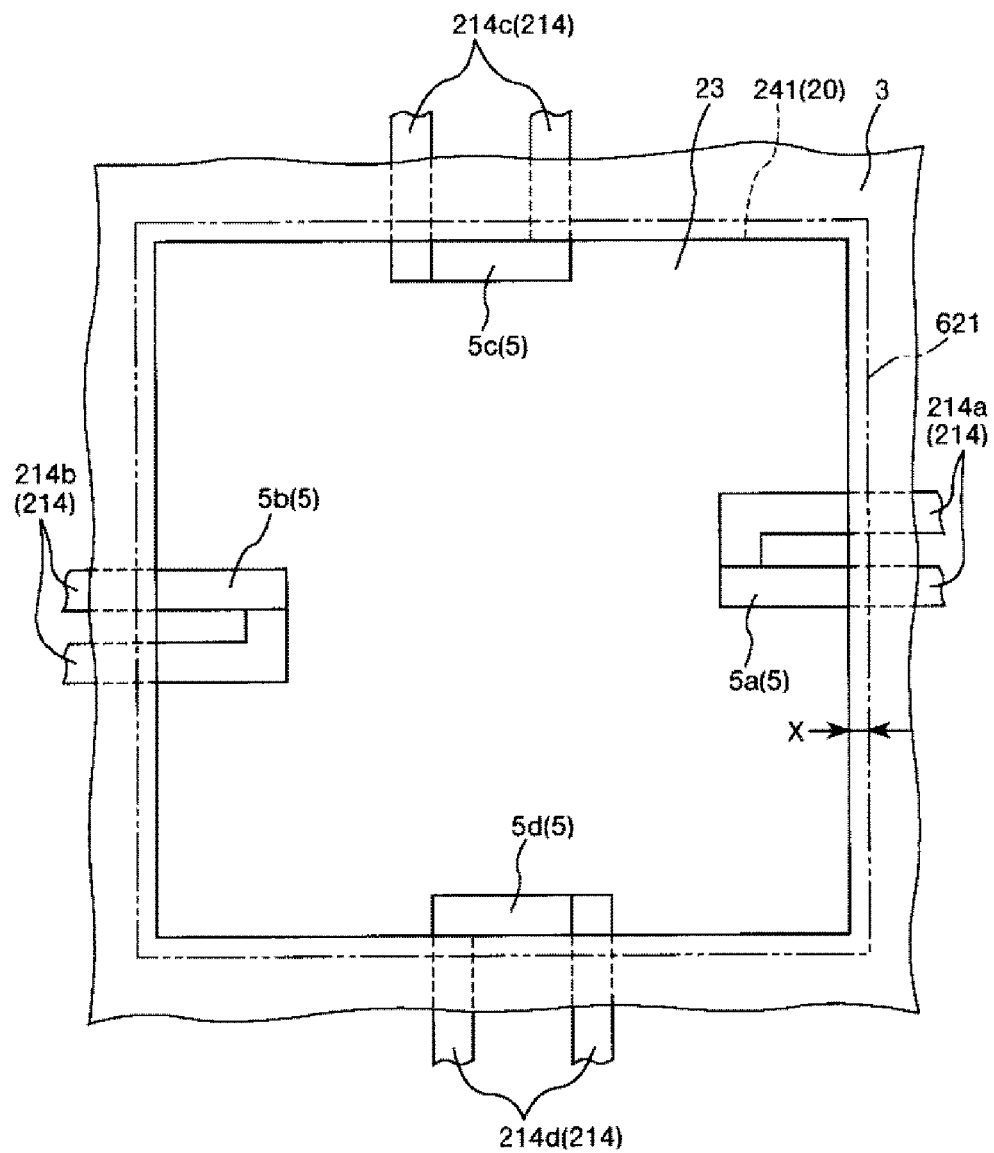
FIG. 2 is a plan view showing the arrangement of piezoresistance devices (sensor devices) and a sidewall portion of the physical quantity sensor shown in FIG. 1.
Figure 3A:
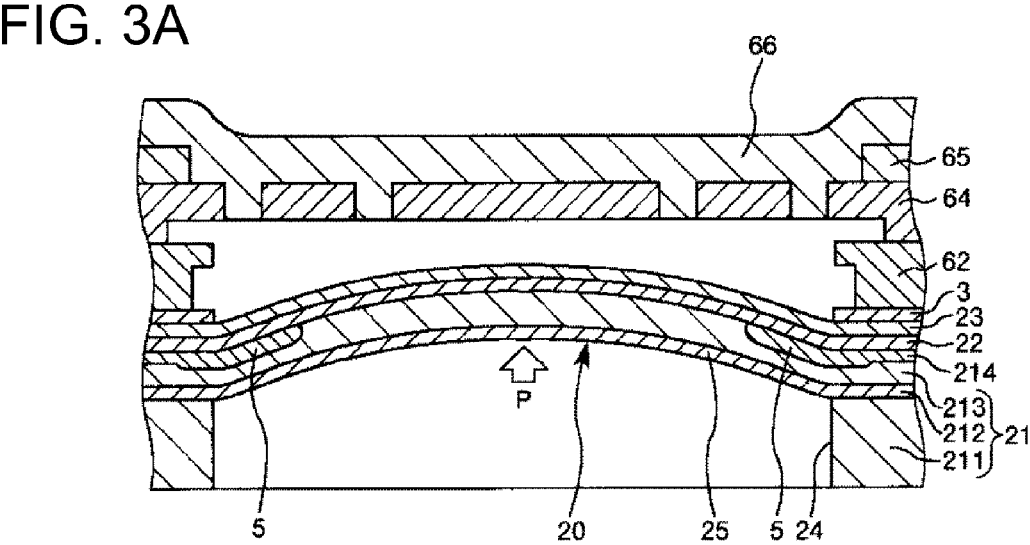
FIGS. 3A and 3B describe an effect of the physical quantity sensor shown in FIG. 1.
Figure 3B:
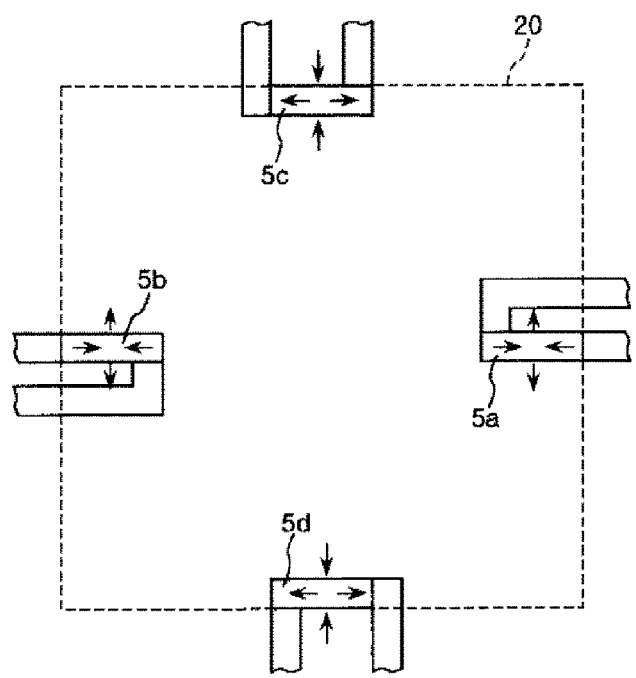

FIG. 1 is a cross-sectional view showing a physical quantity sensor according to a first embodiment of the invention. FIG. 2 is a plan view showing the arrangement of piezoresistance devices (sensor devices) and a sidewall portion of the physical quantity sensor shown in FIG. 1. FIGS. 3A and 3B describe an effect of the physical quantity sensor shown in FIG. 1. FIG. 3A is a cross-sectional view showing a pressurized state, and FIG. 3B is a plan view showing the pressurized state. In the following description, the upper side and the lower side in FIG. 1 are called "upper" and "lower," respectively, for ease of description.

A physical quantity sensor 1 shown in FIG. 1 includes a substrate 2, which has a diaphragm 20, a plurality of piezoresistance devices 5 (sensor devices), which are disposed in the diaphragm 20, a laminated structural body 6, which forms, along with the substrate 2, a cavity S (pressure reference chamber), and a step formation layer 3, which is disposed between the substrate 2 and the laminated structural body 6.

Each of the portions that form the physical quantity sensor 1 will be sequentially described below.

Substrate

The substrate 2 has a semiconductor substrate 21, an insulating film 22, which is provided on one surface of the semiconductor substrate 21, and an insulating film 23, which is provided on the opposite surface of the insulating film 22 to the semiconductor substrate 21.

The semiconductor substrate 21 is an SOI substrate having a silicon layer 211 (handle layer), which is made of single crystal silicon, a silicon oxide layer 212 (box layer), which is formed of a silicon oxide film, and a silicon layer 213 (device layer), which is made of single crystal silicon, with the layers 211 to 213 laminated on each other in this order. The semiconductor substrate 21 is not limited to an SOI substrate and may, for example, be a different semiconductor substrate, such as a single crystal silicon substrate.

The insulating film 22 is, for example, a silicon oxide film, which has an insulation property. The insulating film 23 is, for example, a silicon nitride film, which has an insulation property and is also resistant to an etchant containing hydrofluoric acid. Since the insulating film 22 (silicon oxide film) is interposed between the semiconductor substrate 21 (silicon layer 213) and the insulating film 23 (silicon nitride film), the insulating film 22 can suppress propagation of stress induced when the insulating film 23 is formed to the semiconductor substrate 21. Further, the insulating film 22 can also be used as an interdevice separation film, when a semiconductor circuit is formed on and above the semiconductor substrate 21. The insulating film 22 or 23 is not necessarily made of the material described above, and one of the insulating films 22 and 23 may be omitted as required.

The step formation layer 3, which is a patterned layer, is disposed on the insulating film 23 of the thus configured substrate 2. The step formation layer 3 is so formed that it surrounds the diaphragm 20 in a plan view and forms a stepped portion having the same thickness as that of the step formation layer 3 in a central (inner) portion of the diaphragm 2 portion between the upper surface of the step formation layer 3 and the upper surface of the substrate 2. The thus configured step formation layer 3 allows, when the diaphragm 20 undergoes bending deformation under pressure, the resultant stress to concentrate in a boundary portion between the diaphragm 20 and the stepped portion. Therefore, disposing the piezoresistance devices 5 along the boundary portion (or portion therearound) allows improvement in detection sensitivity.

The step formation layer 3 is made, for example, of single crystal silicon, polycrystal silicon (polysilicon), or amorphous silicon. The step formation layer 3 may instead be made, for example, of single crystal silicon, polycrystal silicon (polysilicon), or amorphous silicon into which phosphorus, boron, or any other impurity is doped (diffused or implanted). In this case, the step formation layer 3 is electrically conductive. Therefore, when a MOS transistor is, for example, formed on the substrate 2 in a region outside the cavity S, part of the step formation layer 3 can be used as the gate electrode of the MOS transistor. Further, part of the step formation layer 3 can also be used as a wiring line.

The thus configured substrate 2 is provided with the diaphragm 20, which is thinner than the portion around the diaphragm 20 and undergoes bending deformation under pressure. The diaphragm 20 is formed by providing a bottomed recess 24 located on the lower side of the semiconductor substrate 21. That is, the diaphragm 20 is so configured that the bottom of the recess 24, which is open on one side of the substrate 2, forms part of the diaphragm 20. The lower surface of the diaphragm 20 serves as a pressure receiving surface 25. In the present embodiment, the diaphragm 20 has a square shape in a plan view, as shown in FIG. 2.

In the substrate 2 in the present embodiment, the recess 24 passes through the silicon layer 211, and the diaphragm 20 has a four-layer configuration including the silicon oxide layer 212, the silicon layer 213, the insulating film 22, and the insulating film 23. The silicon oxide layer 212 can be used as an etching stop layer when the recess 24 is formed in an etching process in the step of manufacturing the physical quantity sensor 1, as will be described later, whereby product-to-product variation in the thickness of the diaphragm 20 can be reduced.

The recess 24 may not pass through the silicon layer 211, and the diaphragm 20 may have a five-layer configuration including a thin portion of the silicon layer 211, the silicon oxide layer 212, the silicon layer 213, the insulating film 22, and the insulating film 23.

Piezoresistance Device

Each of the plurality of piezoresistance devices 5 is formed in the diaphragm 20 on the side facing the cavity S, as shown in FIG. 1. The piezoresistance devices 5 are formed in the silicon layer 213 of the semiconductor substrate 21.

The plurality of piezoresistance devices 5 are formed of a plurality of piezoresistance devices 5a, 5b, 5c, and 5d arranged in a circumferential portion of the diaphragm 20, as shown in FIG. 2.

The piezoresistance devices 5a, 5b, 5c, and 5d are disposed in correspondence with the four sides of the diaphragm 20, which has a rectangular shape in a plan view viewed in the thickness direction of the substrate 2 (hereinafter simply referred to as "plan view").

The piezoresistance device 5a extends in the direction perpendicular to the corresponding side of the diaphragm 20. A pair of wiring lines 214a are electrically connected to the opposite ends of the piezoresistance device 5a. Similarly, the piezoresistance device 5b extends in the direction perpendicular to the corresponding side of the diaphragm 20. A pair of wiring lines 214b are electrically connected to the opposite ends of the piezoresistance device 5b.

On the other hand, the piezoresistance device 5c extends in the direction parallel to the corresponding side of the diaphragm 20. A pair of wiring lines 214c are electrically connected to the opposite ends of the piezoresistance device 5c. Similarly, the piezoresistance device 5d extends in the direction parallel to the corresponding side of the diaphragm 20. A pair of wiring lines 214d are electrically connected to the opposite ends of the piezoresistance device 5d.

In the following description, the wiring lines 214a, 214b, 214c, and 214d are also collectively called "wiring lines 214."

Each of the piezoresistance devices 5 and the wiring lines 214 is made of silicon (single crystal silicon) into which phosphorus, boron, or any other impurity is doped (diffused or implanted). The concentration at which an impurity is doped into the wiring lines 214 is higher than the concentration at which the impurity is doped into the piezoresistance devices 5. The wiring lines 214 may instead be made of a metal.

The plurality of piezoresistance devices 5 are so configured that the resistance values thereof in a natural state are, for example, equal to each other.

The piezoresistance devices 5 described above, along with the wiring lines 214 and other components, form a bridge circuit (Wheatstone bridge circuit). A drive circuit (not shown) that supplies a drive voltage is connected to the bridge circuit. The bridge circuit outputs a signal (voltage) according to the resistance values of the piezoresistance devices 5.

Laminated Structural Body

The laminated structural body 6 is so formed that it defines the cavity S between the laminated structural body 6 and the substrate 2 described above. The laminated structural body 6 is a "wall portion" that is disposed on the side of the diaphragm 20 where the piezoresistance devices 5 are present and forms, along with the diaphragm 20 (or substrate 2), the cavity S (pressure reference chamber).

The laminated structural body 6 has an interlayer insulating film 61, which is so formed on the substrate 2 that the interlayer insulating film 61 surrounds the piezoresistance devices 5 in the plan view, a wiring layer 62, which is formed on the interlayer insulating film 61, an interlayer insulating film 63, which is formed on the wiring layer 62 and the interlayer insulating film. 61, a wiring layer 64, which is formed on the interlayer insulating film 63 and has a coating layer 641 having a plurality of thin holes 642 (open holes), a surface protection film 65, which is formed on the wiring layer 64 and the interlayer insulating film 63, and a sealing layer 66, which is provided on the coating layer 641. The coating layer 641 of the wiring layer 64 is a "ceiling portion" that faces the diaphragm 20 via the cavity S, and a structural body formed of the wiring layer 62 and a portion of the wiring layer 64 excluding the coating layer 641 is disposed between the substrate 2 and the coating layer 641 and is a "sidewall portion" that forms, along with the substrate 2 and the coating layer 641, the cavity S. The sidewall portion and items associated therewith will be described later in detail.

Each of the interlayer insulating films 61 and 63 is formed, for example, of a silicon oxide film. Each of the wiring layers 62 and 64 and the sealing layer 66 is made of aluminum or any other metal. The sealing layer 66 seals the thin holes 642 provided in the coating layer 641. The surface protection film 65 is, for example, a silicon nitride film. Each of the wiring layers 62 and 64 has a portion so formed that it surrounds the cavity S in the plan view.

The thus configured laminated structural body 6 can be formed by using a semiconductor manufacturing process, such as a CMOS process. A semiconductor circuit may be fabricated on and above the silicon layer 213. The semiconductor circuit has an active device, such as a MOS transistor, and other circuit elements formed as required, such as a capacitor, an inductor, a resistor, a diode, wiring lines (including wiring lines connected to piezoresistance devices 5).

The cavity S defined by the substrate 2 and the laminated structural body 6 is a closed-up space. The cavity S functions as a pressure reference chamber that provides a reference value of the pressure detected by the physical quantity sensor 1. In the present embodiment, the cavity S is maintained in a vacuum state (in which pressure is lower than or equal to 300 Pa). Maintaining the cavity S in the vacuum state allows the physical quantity sensor 1 to be used as an "absolute pressure sensor" that detects pressure with reference to the vacuum state, whereby the physical quantity sensor 1 provides improved convenience.

The cavity S is, however, not necessarily maintained in a vacuum state and may instead be maintained in an atmospheric state, a decompressed state in which the pressure is lower than the atmospheric pressure, or a pressurized state in which the pressure is higher than the atmospheric pressure. Further, a nitrogen gas, a rare gas, or any other inert gas may be sealed in the cavity S.

The configuration of the physical quantity sensor 1 has been briefly described.

In the thus configured physical quantity sensor 1, the diaphragm 20 undergoes deformation in accordance with pressure P acting on the pressure receiving surface 25 of the diaphragm 20, as shown in FIG. 3A. In response to the deformation, the piezoresistance devices 5a, 5b, 5c, and 5d are distorted, as shown in FIG. 3B, and the resistance values of the piezoresistance devices 5a, 5b, 5c, and 5d change. The output from the bridge circuit, which is formed of the piezoresistance devices 5a, 5b, 5c, and 5d, therefore changes, and the magnitude of pressure received by the pressure receiving surface 25 can be determined based on the output.

More specifically, in the natural state in which the deformation of the diaphragm 20 described above occurs, for example, when the resistance values of the piezoresistance devices 5a, 5b, 5c, and 5d are equal to each other, the product of the resistance values of the piezoresistance devices 5a and 5b is equal to the product of the resistance values of the piezoresistance devices 5c and 5d, and the output from (potential difference in) the bridge circuit is zero.

On the other hand, when the diaphragm 20 undergoes the deformation described above, compression distortion in the longitudinal direction of the piezoresistance devices 5a and 5b and tensile distortion in the width direction thereof occur in the piezoresistance devices 5a and 5b, and tensile distortion in the longitudinal direction of the piezoresistance devices 5c and 5d and compression distortion in the width direction thereof occur in the piezoresistance devices 5c and 5d, as shown in FIG. 3B. Therefore, when the diaphragm 20 undergoes the deformation described above, the resistance values of the piezoresistance devices 5a and 5b or the resistance values of the piezoresistance devices 5c and 5d increase, whereas the resistance values of the piezoresistance devices 5c and 5d or the resistance values of the piezoresistance devices 5a and 5b decrease.

The distortion of the piezoresistance devices 5a, 5b, 5c, and 5d causes a difference between the product of the resistance values of the piezoresistance devices 5a and 5b and the product of the resistance values of the piezoresistance devices 5c and 5d, and the bridge circuit outputs an output (potential difference) according to the difference. The magnitude of the pressure (absolute pressure) received by the pressure receiving surface 25 can be determined based on the output from the bridge circuit.

When the diaphragm 20 undergoes the deformation described above, since the resistance values of the piezoresistance devices 5a and 5b or the resistance values of the piezoresistance devices 5c and 5d increase, whereas the resistance values of the piezoresistance devices 5c and 5d or the resistance values of the piezoresistance devices 5a and 5b decrease, the difference between the product of the resistance values of the piezoresistance devices 5a and 5b and the product of the resistance values of the piezoresistance devices 5c and 5d is allowed to change by a large amount, and the output from the bridge circuit can be increased accordingly. As a result, pressure detection sensitivity can be increased.

Sidewall Portion

The sidewall portion will be described below in detail.

Figure 4A:
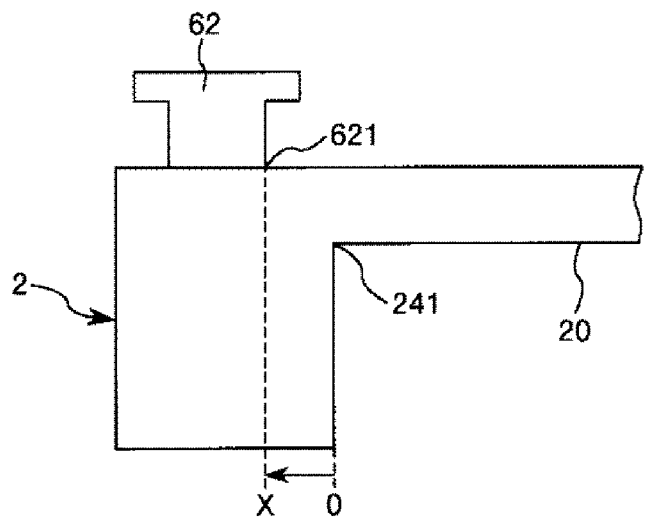
FIGS. 4A to 4C are diagrammatic views for describing a sidewall portion provided in the physical quantity sensor shown in FIG. 1 and the position of the sidewall portion (distance X).
Figure 4B:
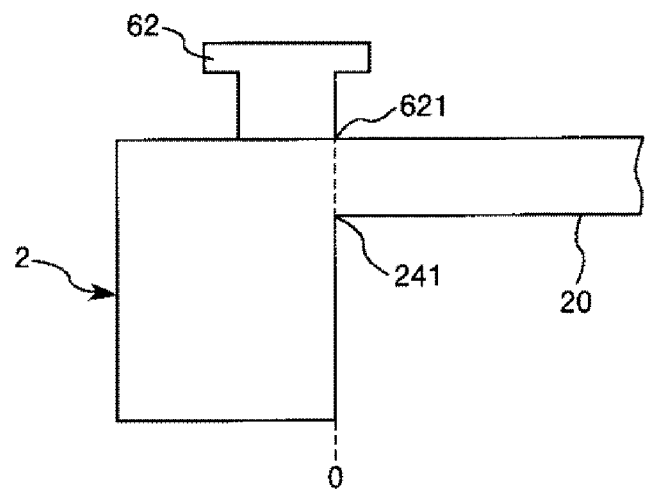
Figure 4C:
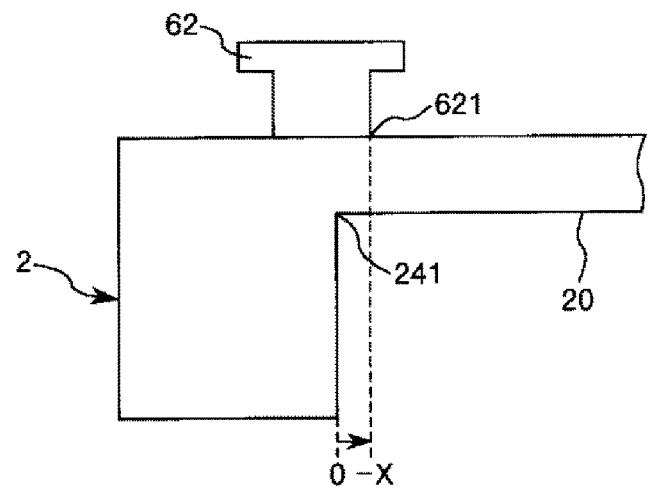
Figure 5:
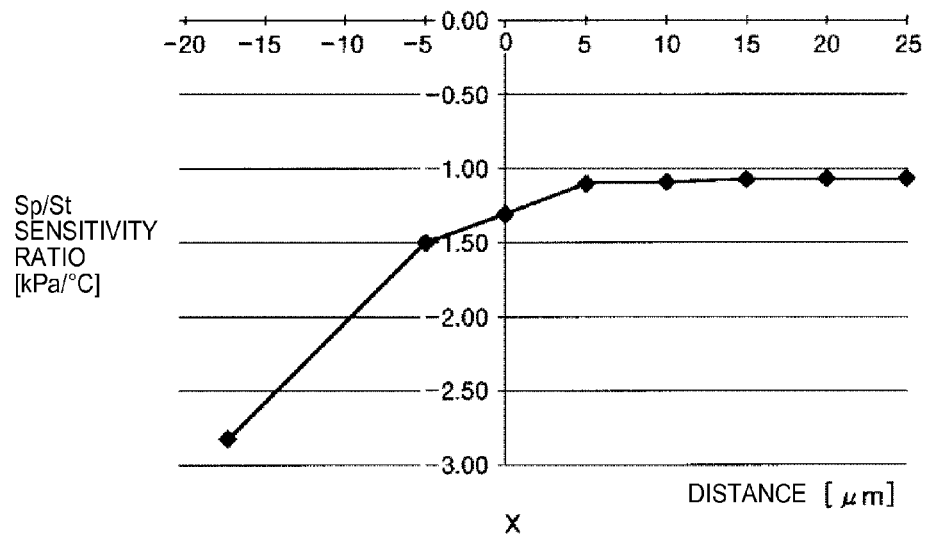
FIG. 5 is a graph showing the relationship between the position of the sidewall portion (distance X) and a sensitivity ratio (atmospheric pressure sensitivity/temperature sensitivity).
Figure 6:
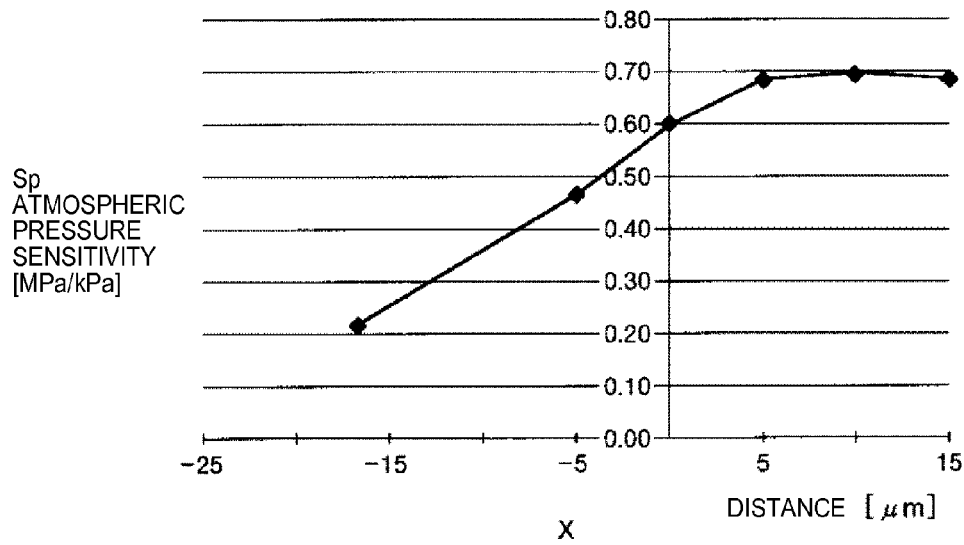
FIG. 6 is a graph showing the relationship between the position of the sidewall portion (distance X) and atmospheric pressure sensitivity.
Figure 7:
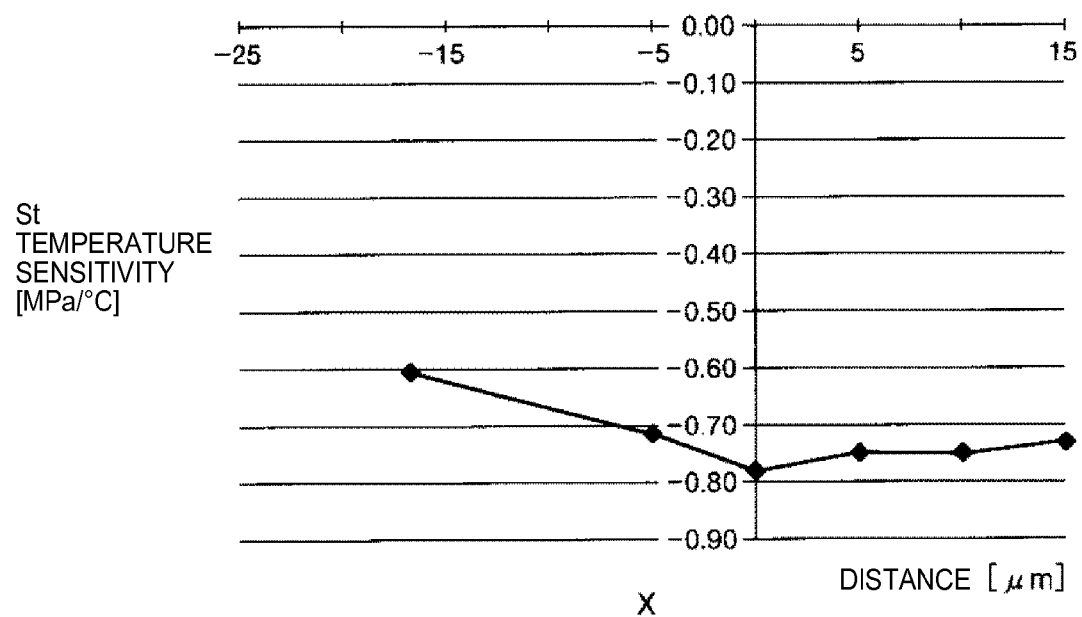
FIG. 7 is a graph showing the relationship between the position of the sidewall portion (distance X) and temperature sensitivity.

FIGS. 4A to 4C are diagrammatic views for describing the sidewall portion provided in the physical quantity sensor 1 shown in FIG. 1 and the position of the sidewall portion (distance X). FIG. 5 is a graph showing the relationship between the position of the sidewall portion (distance X) and a sensitivity ratio (atmospheric pressure sensitivity/temperature sensitivity). FIG. 6 is a graph showing the relationship between the position of the sidewall portion (distance X) and atmospheric pressure sensitivity. FIG. 7 is a graph showing the relationship between the position of the sidewall portion (distance X) and temperature sensitivity.

Each of the wiring layers 62 and 64 is made of a metal, as described above. That is, the "ceiling portion," which is formed of the coating layer 641, and the "sidewall portion," which is formed of the structural body formed of the wiring layer 62 and the portion of the wiring layer 64 excluding the coating layer 641, both contain metals. On the other hand, the substrate 2 is primarily made of silicon.

The coefficient of linear expansion of the wiring layers 62 and 64 is greater than the coefficient of linear expansion of the substrate 2, and the difference in coefficient of linear expansion between the wiring layers 62, 64 and the substrate 2 is relatively large. Stress induced in the wiring layers 62 and 64 due to a change in temperature is therefore transmitted to the substrate 2. In this process, if the stress is transmitted to the diaphragm 20, the sensitivity characteristic thereof undesirably changes.

To avoid the situation described above, in the physical quantity sensor 1, an end 621 of the inner wall surface of the wiring layer 62 on the side where the substrate 2 is present in the direction in which the ceiling portion and the substrate 2 are arranged is located outside a circumferential edge 241 of the bottom of the recess 24 in the plan view, as shown in FIG. 2. That is, in the plan view, the circumferential edge 241 of the bottom of the recess 24 is located closer to the center of the diaphragm 20 than the end 621 of the inner wall surface of the wiring layer 62 on the side where the substrate 2 is present. Therefore, since the wiring layer 62 is connected to a thick, relatively rigid portion of the substrate 2 (portion different from thin portion where recess 24 is formed), the transmission of the distortion of the wiring layers 62 and 64 to the diaphragm 20 (thin portion) can be suppressed even when the difference in coefficient of linear expansion between the wiring layers 62, 64 and the substrate 2 is large. The physical quantity sensor 1 therefore has an excellent temperature characteristic.

In the physical quantity sensor 1, since the cavity S is disposed on the opposite side of the substrate 2 to the side where the recess 24 is open, the distortion of the wiring layers 62 and 64 described above is undesirably directly transmitted to the diaphragm 20 and the sensitivity characteristic thereof significantly changes if the end 621 of the inner wall surface of the wiring layer 62 on the side where the substrate 2 is present is located inside the circumferential edge 241 of the bottom of the recess 24 in the plan view. Employing the configuration in which the end 621 of the inner wall surface of the wiring layer 62 on the side where the substrate 2 is present is located outside the circumferential edge 241 of the bottom of the recess 24 in the plan view can therefore effectively suppress the transmission of the distortion of the wiring layers 62 and 64 to the diaphragm 20 (thin portion).

Further, in the plan view, the distance X between the circumferential edge 241 of the bottom of the recess 24 and the end 621 of the inner circumferential surface of the wiring layer 62 on the side where the substrate 2 is present is preferably greater than or equal to 0.1 µm but smaller than or equal to 25 µm, more preferably greater than or equal to 5 µm but smaller than or equal to 20 µm, further preferably greater than or equal to 5 µm but smaller than or equal to 15 µm. The transmission of the distortion of the wiring layers 62 and 64 to the diaphragm 20 can thus be effectively suppressed.

In contrast, when the distance X is too small, the distortion induced in the wiring layers 62 and 64 tends to be transmitted to the diaphragm 20 depending on the materials of which the wiring layers 62 and 64 are made, the thickness of the diaphragm 20, and other factors. On the other hand, when the distance X is too large, the size of the physical quantity sensor 1 simply undesirably increases. Further, too large distance X does not further improve the effect of suppression of the transmission of the distortion of the wiring layers 62 and 64 to the diaphragm 20 but tends to not only unnecessarily increase the size of the coating layer 641 and hence cause the coating layer 641 to be prone to collapse but also reduce the degree of vacuum in the cavity S.

The graph shown in FIG. 5 is a result of a simulation in a case where the width of the diaphragm 20 (the distance from the edge of the diaphragm to the edge facing the diaphragm in the plan view) is 150 µm and the thickness of the diaphragm 20 is 3 µm. The "distance X" is the distance measured outward from the diaphragm 20 with reference to the circumferential edge 241 of the bottom of the recess 24 (position "0" in FIGS. 4A to 4C), and a distance to a point outside the circumferential edge 241 has a "+" value and a distance to a point inside the circumferential edge 241 has a "−" value. Further, the "sensitivity ratio" (Sp/St) in FIG. 5 is the ratio of the atmospheric pressure sensitivity (Sp) shown in FIG. 6 to the temperature sensitivity (St) shown in FIG. 7.

In the present embodiment, the distance X is fixed along the entire circumferential edge of the bottom of the recess 24. Satisfying the range of the distance X described above can therefore effectively suppress the transmission of the distortion of the wiring layers 62 and 64 to the diaphragm 20 (thin portion). Part of the circumferential edge 241 of the bottom of the recess 24 in the circumferential direction may be a portion where the distance to the end 621 of the inner circumferential surface of the wiring layer 62 on the side where the substrate 2 is present differs from the distance in the other portions or may be a portion where the distance does not fall within the range described above.

In the physical quantity sensor 1, since each of the wiring layers 62 and 64 contains a metal as described above, the cavity S can be formed in a very hermetic manner.

The metal used as the material of which each of the wiring layers 62 and 64 is made is preferably aluminum, titanium, or a titanium nitride. These metals have close affinity with a semiconductor manufacturing process. The cavity S can therefore be formed with precision in a relatively simple manner.

Further, when the thickness of the diaphragm 20 falls within a range greater than or equal to 1 µm but smaller than or equal to 8 µm, and when the width of the diaphragm 20 falls within a range greater than or equal to 50 µm but smaller than or equal to 300 µm, simulations have shown that the same result as that shown in FIG. 5 is obtained.

It is therefore preferable that the thickness of the diaphragm 20 falls within the range greater than or equal to 1 µm but smaller than or equal to 8 µm and the width of the diaphragm 20 falls within the range greater than or equal to 50 µm but smaller than or equal to 300 µm. In other words, it is preferable that the thickness of the diaphragm 20 is greater than or equal to 0.1 times but smaller than or equal to 0.8 times the distance X and the width of the diaphragm 20 is greater than or equal to 5 times but smaller than or equal to 30 times the distance X.

Method for Manufacturing Physical Quantity Sensor

Next, a method for manufacturing the physical quantity sensor 1 will be briefly described.

FIGS. 8A to 8D and FIGS. 9E to 9G show the steps of manufacturing the physical quantity sensor shown in FIG. 1. A method for manufacturing the physical quantity sensor 1 will be described below with reference to FIGS. 8A to 8D and FIGS. 9E to 9G.

Distortion Detection Device Formation Step

Figure 8A:
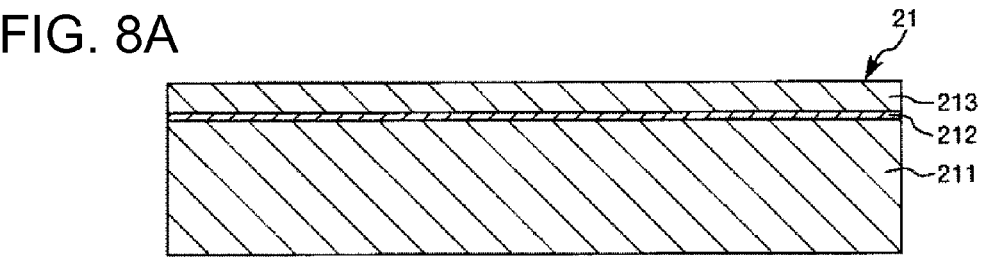
FIGS. 8A to 8D show the steps of manufacturing the physical quantity sensor shown in FIG. 1.

The semiconductor substrate 21, which is an SOI substrate, is first provided, as shown in FIG. 8A.

Figure 8B:
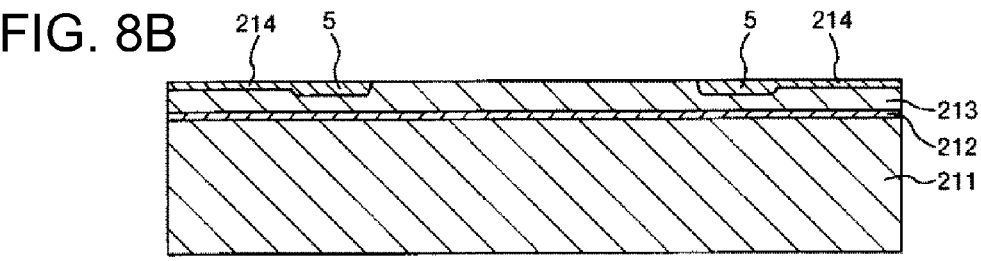

Phosphorus (n-type), boron (p-type), or any other impurity is then doped (ion implantation) into the silicon layer 213 of the semiconductor substrate 21 to form the plurality of piezoresistance devices 5 and the wiring lines 214, as shown in FIG. 8B.

For example, when boron ions are implanted at +80 keV, the concentration of the ion implanted into the piezoresistance devices 5 is set at about $1\times10^{14}$ atoms/cm$^2$. Further, the concentration of the ions implanted into the wiring lines 214 is set to be higher than the concentration of the ions implanted into the piezoresistance devices 5. For example, when boron ions are implanted at 10 keV, the concentration of the ions implanted into the wiring lines 214 is set at about $5\times10^{15}$ atoms/cm$^2$. Further, after the ion implantation described above, for example, annealing is performed at about 1000° C. for about 20 minutes.

Insulating Film and the Like Formation Step

Figure 8C:
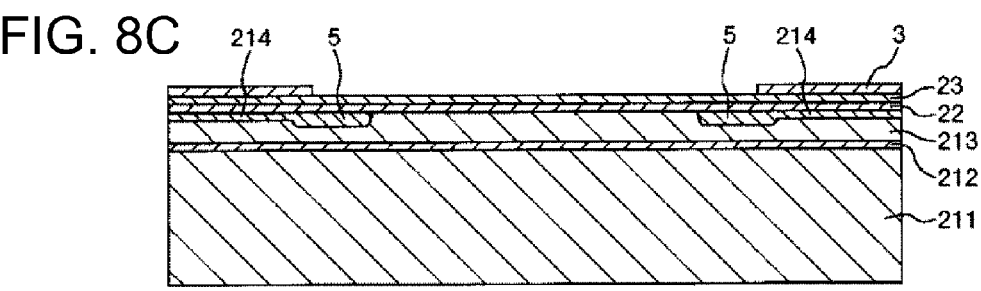

The insulating film 22, the insulating film 23, and the step formation layer 3 are then formed in this order on the silicon layer 213, as shown in FIG. 8C.

The formation of each of the insulating films 22 and 23 can be performed by using sputtering, CVD, or any other method. The step formation layer 3 can be formed, for example, by forming a polycrystal silicon film by using sputtering, CVD, or any other method, then doping phosphorus, boron, or any other impurity into the film (ion implantation) as required, and then patterning the film in an etching process.

Interlayer Insulating Film/Wiring Layer Formation Step

Figure 8D:
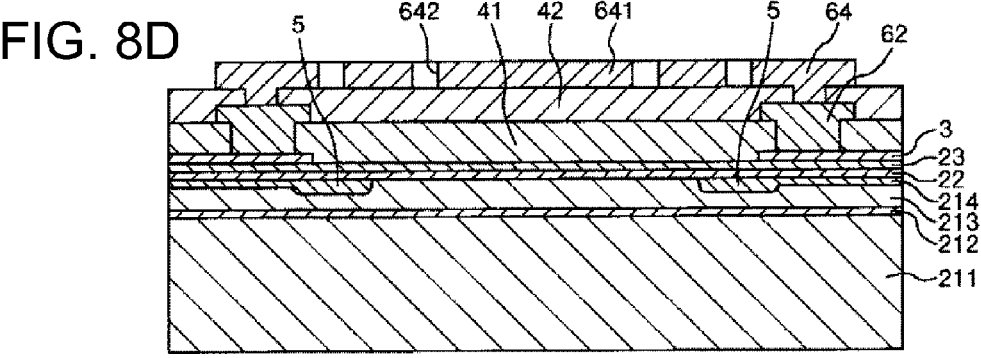

A sacrifice layer 41, the wiring layer 62, a sacrifice layer 42, and the wiring layer 64 are then formed in this order on the insulating film 23, as shown in FIG. 8D.

The sacrifice layers 41 and 42 are partially removed in a cavity formation step, which will be described later, and the remaining portions form the interlayer insulating films 61 and 63. The formation of each of the sacrifice layers 41 and 42 is performed by forming a silicon oxide film by using sputtering, CVD, or any other method and patterning the silicon oxide film in an etching process.

The thickness of each of the sacrifice layers 41 and 42 is not limited to a specific value and is set, for example, at a value greater than or equal to 1500 nm but smaller than or equal to 5000 nm.

The formation of each of the wiring layers 62 and 64 is performed by forming a layer made, for example, of aluminum by using sputtering, CVD, or any other method and then patterning the layer.

The thickness of each of the wiring layers 62 and 64 is not limited to a specific value and is set, for example, at a value greater than or equal to 300 nm but smaller than or equal to 900 nm.

The laminated structure formed of the sacrifice layers 41, 42 and the wiring layers 62, 64 is formed in a typical CMOS process, and the number of laminated layers is appropriately set as required. That is, a greater number of sacrifice layers and wiring layers are laminated as required in some cases.

Cavity Formation Step

Figure 9E:
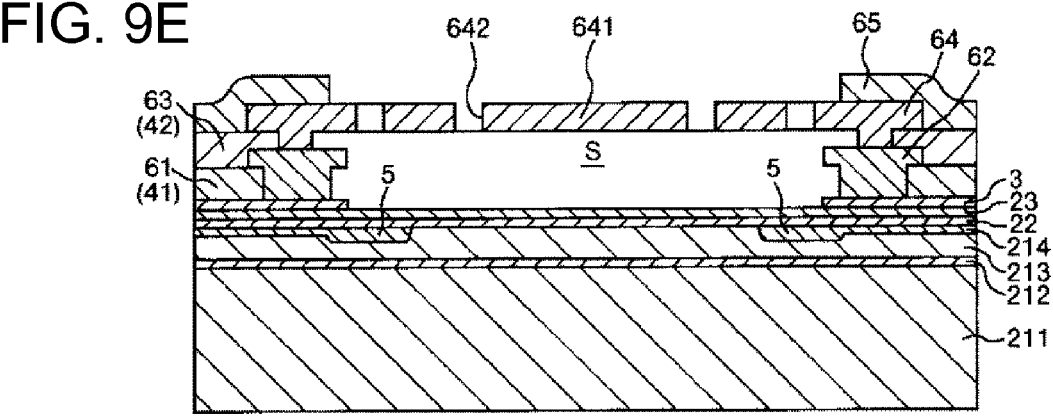
FIGS. 9E to 9G show the steps of manufacturing the physical quantity sensor shown in FIG. 1.

Part of the sacrifice layers 41 and 42 is then removed to form the cavity S between the insulating film 23 and the coating layer 641, as shown in FIG. 9E. The interlayer insulating films 61 and 63 are thus formed.

The formation of the cavity S is performed by removing part of the sacrifice layers 41 and 42 in an etching process carried out through the plurality of thin holes 642 formed in the coating layer 641. When wet etching is used as the etching described above, hydrofluoric acid, buffered hydrofluoric acid, or any other etchant is supplied through the plurality of thin holes 642. When dry etching is used, hydrofluoric acid gas or any other etching gas is supplied through the plurality of thin holes 642. In the etching process, the insulating film 23 functions as an etching stop layer. Further, the insulating film 23, which is resistant to an etchant, further has a function of protecting the configuration portion below the insulating film 23 (insulating film 22, piezoresistance devices 5, and wiring lines 214, for example) from the etchant.

Before the etching, the surface protection film 65 is formed by using sputtering, CVD, or any other method. Portions of the sacrifice layers 41 and 42 that form the interlayer insulating films 61 and 62 can thus be protected in the etching process. The surface protection film 65 can be formed, for example, of a silicon oxide film, a silicon nitride film, a polyimide film, an epoxy resin film, and any other film having resistance for protecting the devices from humidity, dust, scratches, and other substances, and a silicon nitride film is particularly preferably used. The thickness of the surface protection film 65 is not limited to a specific value and is set, for example, at a value greater than or equal to 500 nm but smaller than or equal to 2000 nm.

Sealing Step

Figure 9F:
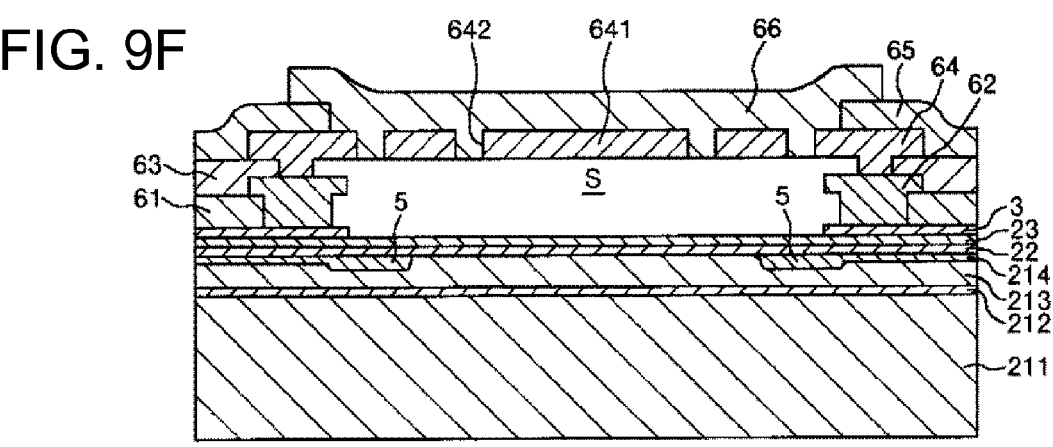

The sealing layer 66, which is formed, for example, of a silicon oxide film, a silicon nitride film, or a metal film made, for example, of Al, Cu, W, Ti, or TiN, is formed on the coating layer 641 by using sputtering, CVD, or any other method to seal the thin holes 642, as shown in FIG. 9F. The cavity S is thus sealed by the sealing layer 66, and the laminated structural body 6 is produced.

The thickness of the sealing layer 66 is not limited to a specific value and is set, for example, at a value greater than or equal to 1000 nm but smaller than or equal to 5000 nm.

Diaphragm Formation Step

Figure 9G:
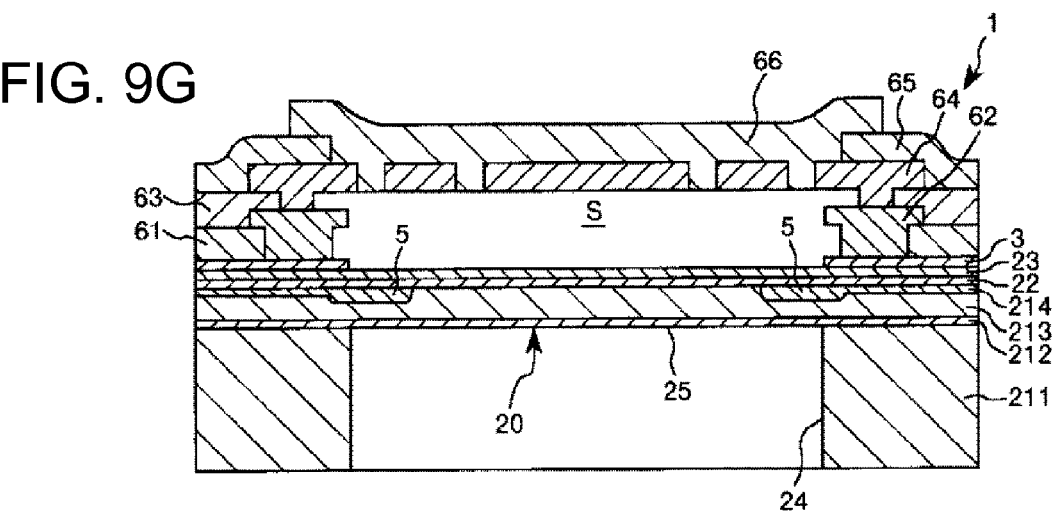

The lower surface of the silicon layer 211 is then polished as required, and part of the lower surface of the silicon layer 211 is etched away (processed) to form the recess 24, as shown in FIG. 9G. The diaphragm 20, which faces the coating layer 641 via the cavity S, is thus formed.

When part of the lower surface of the silicon layer 211 is removed, the silicon oxide layer 212 functions as an etching stop layer. The thickness of the diaphragm 20 can thus be specified with precision.

A method for removing part of the lower surface of the silicon layer 211 may be dry etching, wet etching, or any other method.

The physical quantity sensor 1 can be manufactured by carrying out the steps described above.

Second Embodiment

A second embodiment of the invention will be next described.

Figure 10:
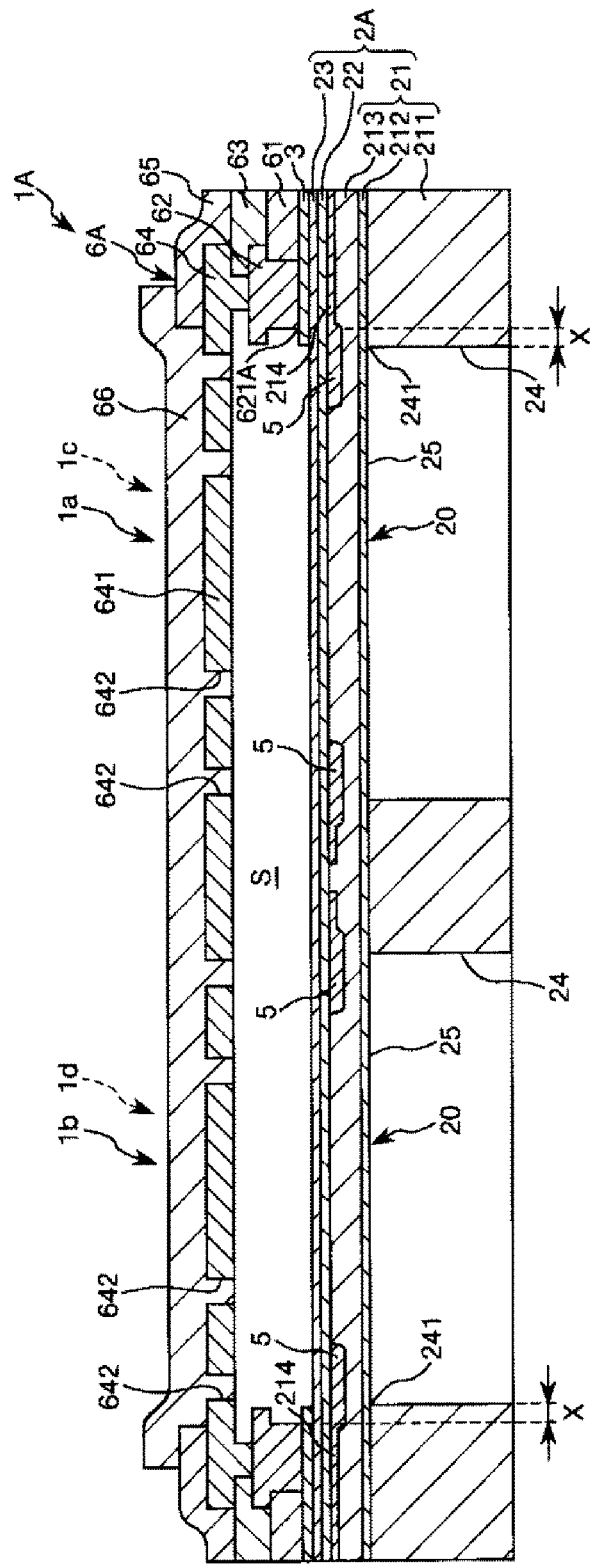
FIG. 10 is a cross-sectional view showing a physical quantity sensor according to a second embodiment of the invention.
Figure 11:
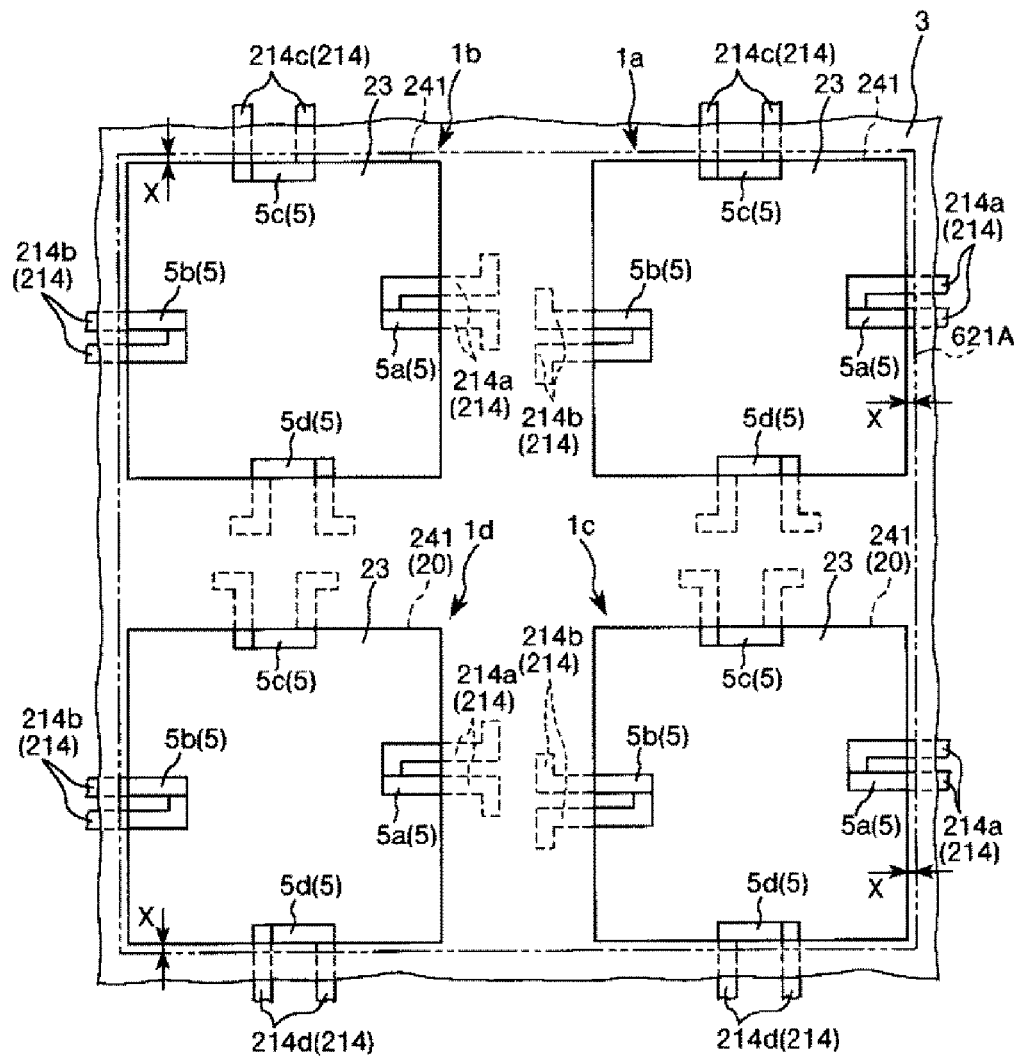
FIG. 11 is a plan view showing the arrangement of piezoresistance devices (sensor devices) and a sidewall portion in the physical quantity sensor shown in FIG. 10.
Figure 12:
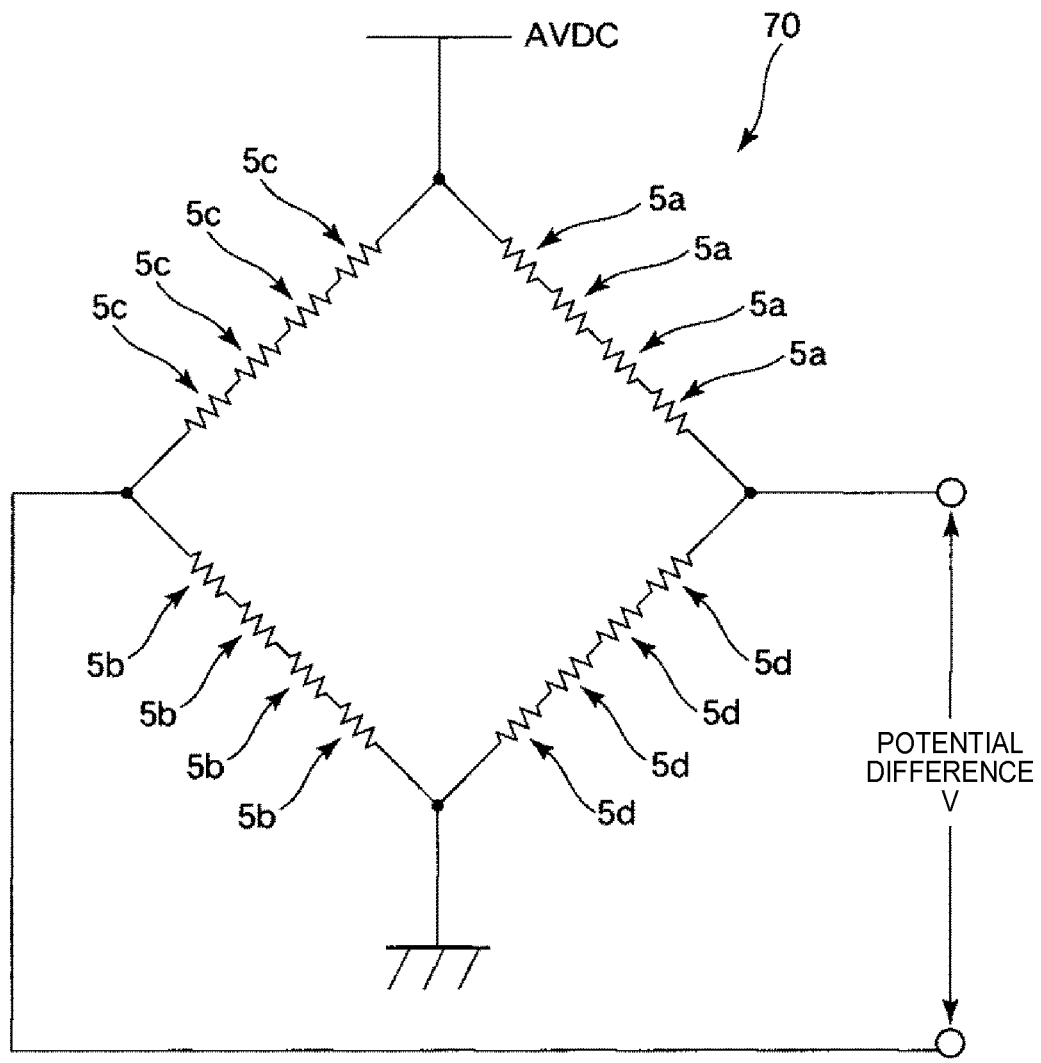
FIG. 12 shows a bridge circuit including the piezoresistance devices in the physical quantity sensor shown in FIG. 10.

FIG. 10 is a cross-sectional view showing a physical quantity sensor according to the second embodiment of the invention. FIG. 11 is a plan view showing the arrangement of piezoresistance devices (sensor devices) and a sidewall portion in the physical quantity sensor shown in FIG. 10. FIG. 12 shows a bridge circuit including the piezoresistance devices in the physical quantity sensor shown in FIG. 10.

The second embodiment of the invention will be described below. In the description, points different from those in the embodiment described above will be primarily described, and the same items will not be described.

The second embodiment is the same as the first embodiment described above except that a plurality of diaphragms are provided.

A physical quantity sensor 1A shown in FIG. 10 has a plurality of diaphragms 20 provided in a single substrate 2A.

That is, the substrate 2A has a plurality of recesses 24. In the present embodiment, four diaphragms 20 are arranged in a matrix, and the piezoresistance devices 5a, 5b, 5c, and 5d are arranged in each of the diaphragms 20, as shown in FIG. 11. It can be said that the thus configured physical quantity sensor 1A includes four units 1a, 1b, 1c, and 1d, each of which includes the diaphragm 20.

The piezoresistance devices 5a, 5b, 5c, and 5d in each of the four units 1a, 1b, 1c, and 1d form a bridge circuit (Wheatstone bridge circuit) shown in FIG. 12. A drive circuit (not shown) that supplies a drive voltage AVDC is connected to the bridge circuit 70. The bridge circuit 70 outputs a signal according to changes in resistance values of the piezoresistance devices 5a, 5b, 5c, and 5d in the form of a potential difference Vout. As a result, even when the area of each of the piezoresistance devices 5 decreases due to size reduction, the total area of the plurality of piezoresistance devices 5 connected to each other in series can be a large area, whereby pressure reception sensitivity (detection sensitivity) can be increased with 1/f noise suppressed. The S/N ratio can therefore be improved even when size reduction is achieved.

In the plan view, the plurality of diaphragms 20 fall within the region of the single cavity S. An end 621A of the inner wall surface of the wiring layer 62 on the side where the substrate 2A is present is located outside the a circumferential edge 241 of the bottom of each of the plurality of the recesses 24 (the plurality of recesses 24 are present within the edge 621A) in the plan view, as shown in FIG. 11. That is, in the plan view, the circumferential edge 241 of the bottom of each of the recesses 24 is located closer to the center of the corresponding diaphragm 20 than the end 621A of the inner wall surface of the wiring layer 62 on the side where the substrate 2A is present. The transmission of the distortion of the wiring layers 62 and 64 to the diaphragms 20 (thin portions) can therefore be suppressed. The physical quantity sensor 1A therefore has an excellent temperature characteristic.

Further, in the plan view, the distance X between the circumferential edge 241 of the bottom of each of the recesses 24 (side portions that are not adjacent to the circumferential edge 241 of the other recesses 24) and the end 621A of the inner circumferential surface of the wiring layer 62 on the side where the substrate 2A is present is preferably greater than or equal to 0.1 µm but smaller than or equal to 25 µm, more preferably greater than or equal to 5 µm but smaller than or equal to 20 µm, further preferably greater than or equal to 5 µm but smaller than or equal to 15 µm. The transmission of the distortion of the wiring layers 62 and 64 to the diaphragms 20 can thus be effectively suppressed.

2. Pressure Sensor

Figure 13:
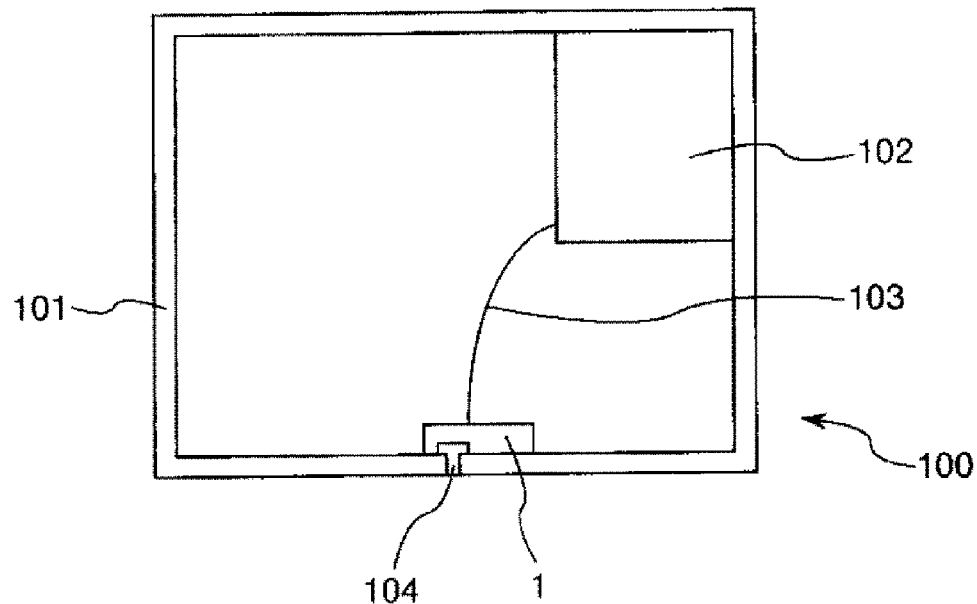
FIG. 13 is a cross-sectional view showing an example of a pressure sensor according to an embodiment of the invention.

A pressure sensor including the physical quantity sensor according to any of the embodiments of the invention (pressure sensor according to an embodiment of the invention) will next be described. FIG. 13 is a cross-sectional view showing an example of the pressure sensor according to the embodiment of the invention.

A pressure sensor 100 according to an embodiment of the invention includes the physical quantity sensor 1, an enclosure 101, which accommodates the physical quantity sensor 1, and a computation section 102, which computes a signal produced by the physical quantity sensor 1 to form pressure data, as shown in FIG. 13. The physical quantity sensor 1 is electrically connected to the computation section 102 via a wiring line 103.

The physical quantity sensor 1 is fixed in the enclosure 101 by using a fixing portion that is not shown. The enclosure 101 has a through hole 104, which allows the diaphragm 20 in the physical quantity sensor 1 to communicate, for example, with the atmosphere (outside the enclosure 101).

According to the thus configured pressure sensor 100, the diaphragm 20 receives pressure via the through hole 104. A signal associated with the received pressure is sent via the wiring line 103 to the computation section, which computes the signal to form pressure data. The computed pressure data can be displayed on a display section that is not shown (monitor of personal computer, for example).

3. Altimeter

Figure 14:
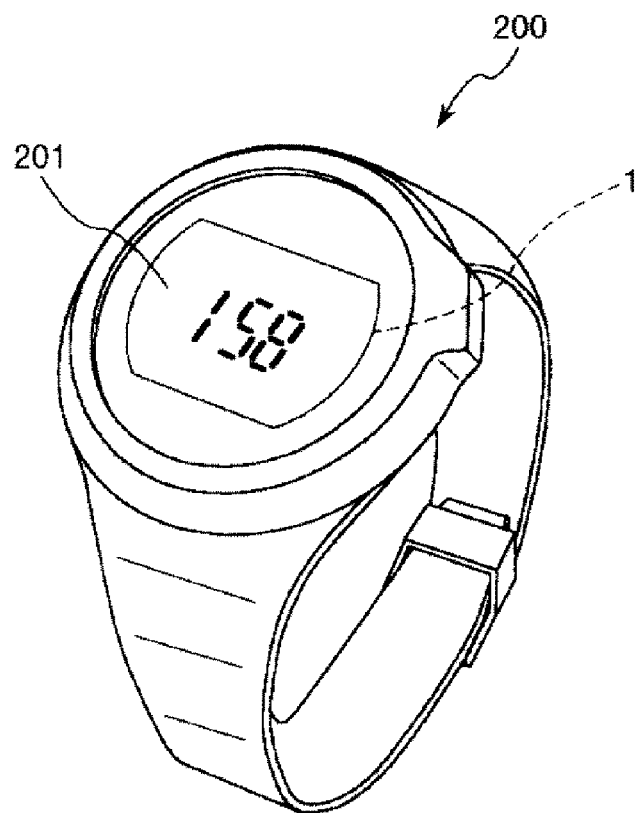
FIG. 14 is a perspective view showing an example of an altimeter according to an embodiment of the invention.

An altimeter including the physical quantity sensor according to any of the embodiments of the invention (altimeter according to an embodiment of the invention) will next be described. FIG. 14 is a perspective view showing an example of the altimeter according to the embodiment of the invention.

An altimeter 200 can be worn around a wrist, as in the case of a wristwatch. The altimeter 200 has the physical quantity sensor 1 (pressure sensor 100) accommodated therein, and a display section 201 can display the altitude of the current location above sea level, the atmospheric pressure at the current location, and other pieces of information.

The display section 201 can further display the current time, user's heart rate, weather, and a variety of other types of information.

4. Electronic Apparatus

Figure 15:
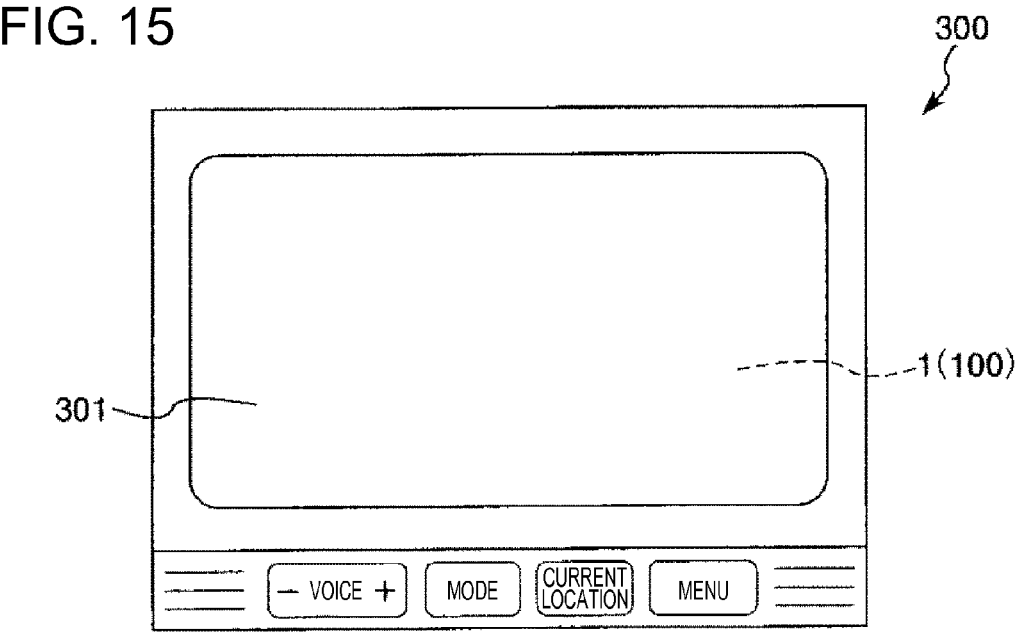
FIG. 15 is a front view showing an example of an electronic apparatus according to an embodiment of the invention.

A navigation system using an electronic apparatus including the physical quantity sensor according to any of the embodiments of the invention will next be described. FIG. 15 is a front view showing an example of the electronic apparatus according to the embodiment of the invention.

A navigation system 300 includes map information that is not shown, a position information acquisition section that acquires position information from a GPS (global positioning system), a self-reliance navigation section that performs self-reliance navigation based on a gyro sensor and acceleration sensor as well as vehicle speed data, the physical quantity sensor 1, and a display section 301, which displays predetermined position information or route information.

According to the navigation system, altitude information can be acquired as well as acquired position information. For example, when the vehicle travels along an elevated road expressed in positional information by roughly the same position as the position representing a ground road, and no altitude information is provided, a navigation system of related art cannot evaluate whether the vehicle travels along the ground road or the elevated road and provides a user with information on the ground road as priority information. In the navigation system 300 according to the present embodiment, the physical quantity sensor 1 can acquire altitude information, detect a change in altitude that occurs when the vehicle travels out of the ground road onto the elevated road, and provide the user with navigation information on a running state along the elevated road.

The display section 301 is, for example, a liquid crystal panel display, an organic EL (organic electro-luminescence) display, or any other display that allows size and thickness reduction.

An electronic apparatus including the piezoresistance device according to any of the embodiments of the invention is not limited to the electronic apparatus described above and can, for example, be a personal computer, a mobile phone, medical apparatus (such as electronic thermometer, blood pressure gauge, blood sugar meter, electrocardiograph, ultrasonic diagnostic apparatus, and electronic endoscope), a variety of measuring apparatus, a variety of instruments (such as instruments in vehicles, airplanes, and ships), and a flight simulator.

5. Moving Object

Figure 16:
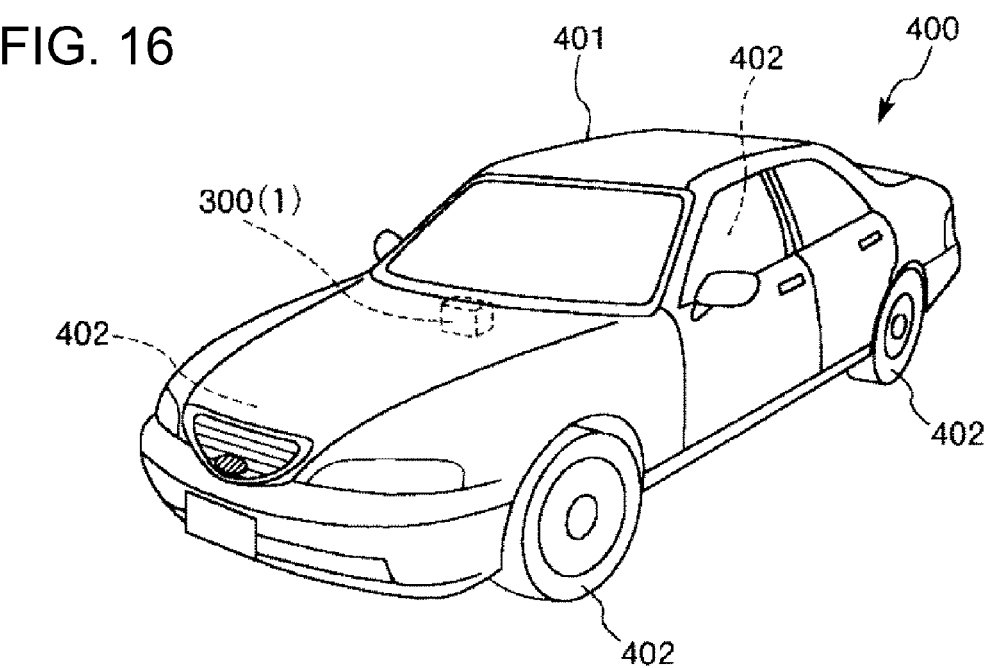
FIG. 16 is a perspective view showing an example of a moving object according to an embodiment of the invention.

A moving object using the physical quantity sensor according to any of the embodiments of the invention (moving object according to an embodiment of the invention) will next be described. FIG. 16 is a perspective view showing an example of the moving object according to the embodiment of the invention.

As shown in FIG. 16, a moving object 400 includes a vehicle body 401 and four wheels 402, and a power source (engine) that is not shown but is provided in the vehicle body 401 rotates the wheels 402. The thus configured moving object 400 accommodates the navigation system 300 (physical quantity sensor 1).

The physical quantity sensor, the pressure sensor, the altimeter, the electronic apparatus, and the moving object according to the embodiments of the invention have been described above with reference to the drawings, but the invention is not limited thereto. The configuration of each portion in the embodiments can be replaced with an arbitrary configuration having the same function, and another arbitrary configuration may be added.

Further, in the embodiments described above, the description has been made with reference to the case where the number of piezoresistance devices provided in a single diaphragm is four, but the number of piezoresistance devices is not limited to four. For example, the number of piezoresistance devices may be greater than or equal to one but smaller than or equal to three or may be five or more. Moreover, the arrangement, shape, and other factors of the piezoresistance devices are not limited to those in the embodiments described above. For example, in the embodiments described above, a piezoresistance device may further be disposed at the center of the diaphragm.

Further, in the embodiments described above, the description has been made with reference to the case where a piezoresistance device is used as a sensor device that detects bending of the diaphragm, but the sensor device is not limited to a piezoresistance device and may instead, for example, be a resonator.

Further, in the embodiments described above, the description has been made with reference to the case where the pressure reference chamber (cavity) is provided on the opposite side of the substrate having the diaphragm to the side where the recess is formed, but the pressure reference chamber may instead be formed on the side of the substrate where the recess is formed. In this case, the pressure reference chamber can be formed, for example, by bonding another substrate to block the recess of the substrate.

What is claimed is:

1. A physical quantity sensor comprising:
a substrate that has a recess that is open toward one side of the substrate;
a diaphragm that has a bottom of the recess as part of the diaphragm and undergoes bending deformation under pressure;
a sensor device that is disposed in the diaphragm;
a ceiling portion that faces the diaphragm via a cavity; and
a sidewall portion that is disposed between the substrate and the ceiling portion, forms, along with the substrate and the ceiling portion, the cavity, and has an inner wall surface that faces the cavity,
wherein at least one of the ceiling portion and the sidewall portion contains a metal, and
in a plan view of the substrate, a circumferential edge of the bottom is closer to the center of the diaphragm than a substrate-side end of the inner wall surface.

2. The physical quantity sensor according to claim 1, wherein both the ceiling portion and the sidewall portion contain a metal.

3. The physical quantity sensor according to claim 1, wherein the metal is aluminum, titanium, or a titanium nitride.

4. The physical quantity sensor according to claim 1, wherein in the plan view, the substrate has a portion separate from a substrate-side end of an inner circumferential surface of the sidewall portion by a value greater than or equal to 0.1 µm but smaller than or equal to 25 µm.

5. The physical quantity sensor according to claim 1, wherein the recess in the substrate is formed of a plurality of recesses, and
the diaphragm is formed of a plurality of diaphragms, and in the plan view, the plurality of diaphragms fall within the region of the single cavity.

6. The physical quantity sensor according to claim 1, wherein the cavity is disposed on the opposite side of the substrate to the side where the recess is open.

7. A pressure sensor comprising the physical quantity sensor according to claim 1.

8. An altimeter comprising the physical quantity sensor according to claim 1.

9. An electronic apparatus comprising the physical quantity sensor according to claim 1.

10. A moving object comprising the physical quantity sensor according to claim 1.

* * * * *